United States Patent [19]
Bähr

[11] 3,743,100
[45] July 3, 1973

[54] FILTER PRESS, MORE PARTICULARLY FOR DEWATERING SLUDGE IN SEWAGE TREATMENT PLANTS

[76] Inventor: Albert Bähr, Parallelstrasse 2a, Elversberg/Saar, Germany

[22] Filed: June 7, 1971

[21] Appl. No.: 150,356

[52] U.S. Cl. .............................. 210/386, 210/401
[51] Int. Cl. ............................................. B01d 33/04
[58] Field of Search ...................... 210/77, 386, 401

[56] References Cited
UNITED STATES PATENTS
| | | | |
|---|---|---|---|
| 3,459,122 | 8/1969 | Pastoors et al. | 210/386 X |
| 3,613,564 | 10/1971 | Adamski et al. | 210/386 X |

FOREIGN PATENTS OR APPLICATIONS
| | | | |
|---|---|---|---|
| 511,803 | 1/1921 | France | 210/401 |
| 732,987 | 2/1943 | Germany | 210/77 |
| 1,199,656 | 12/1959 | France | 210/77 |
| 305,379 | 11/1915 | Germany | 210/77 |

*Primary Examiner*—John Adee
*Attorney*—Robert H. Jacob

[57] ABSTRACT

A process for dewatering sludge particularly for dewatering sludge in sewage treatment plant by means of a filter press having belts one at least of which is a filter belt, the sludge being conveyed around a drum between belts both of which pass around the drum the sludge being squeezed between the belts as it is conveyed around the drum by the belts.

6 Claims, 9 Drawing Figures

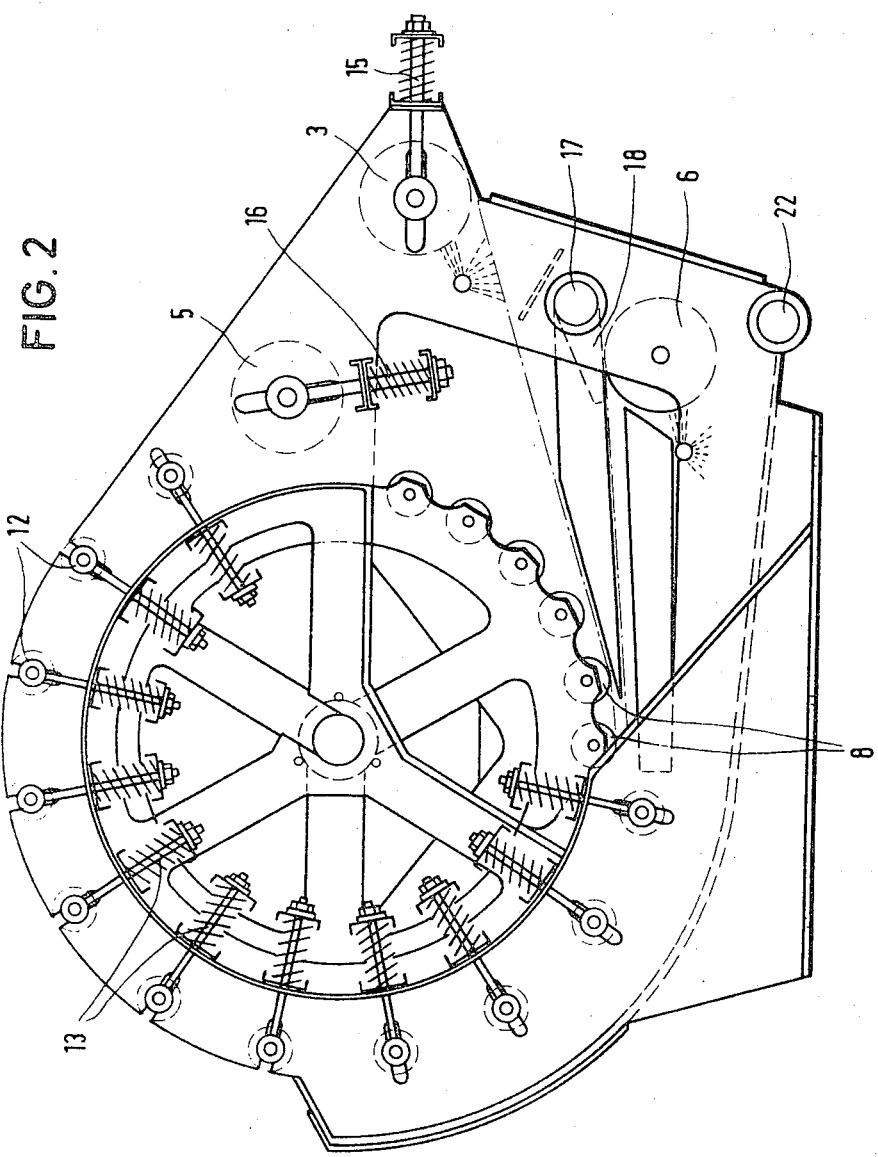

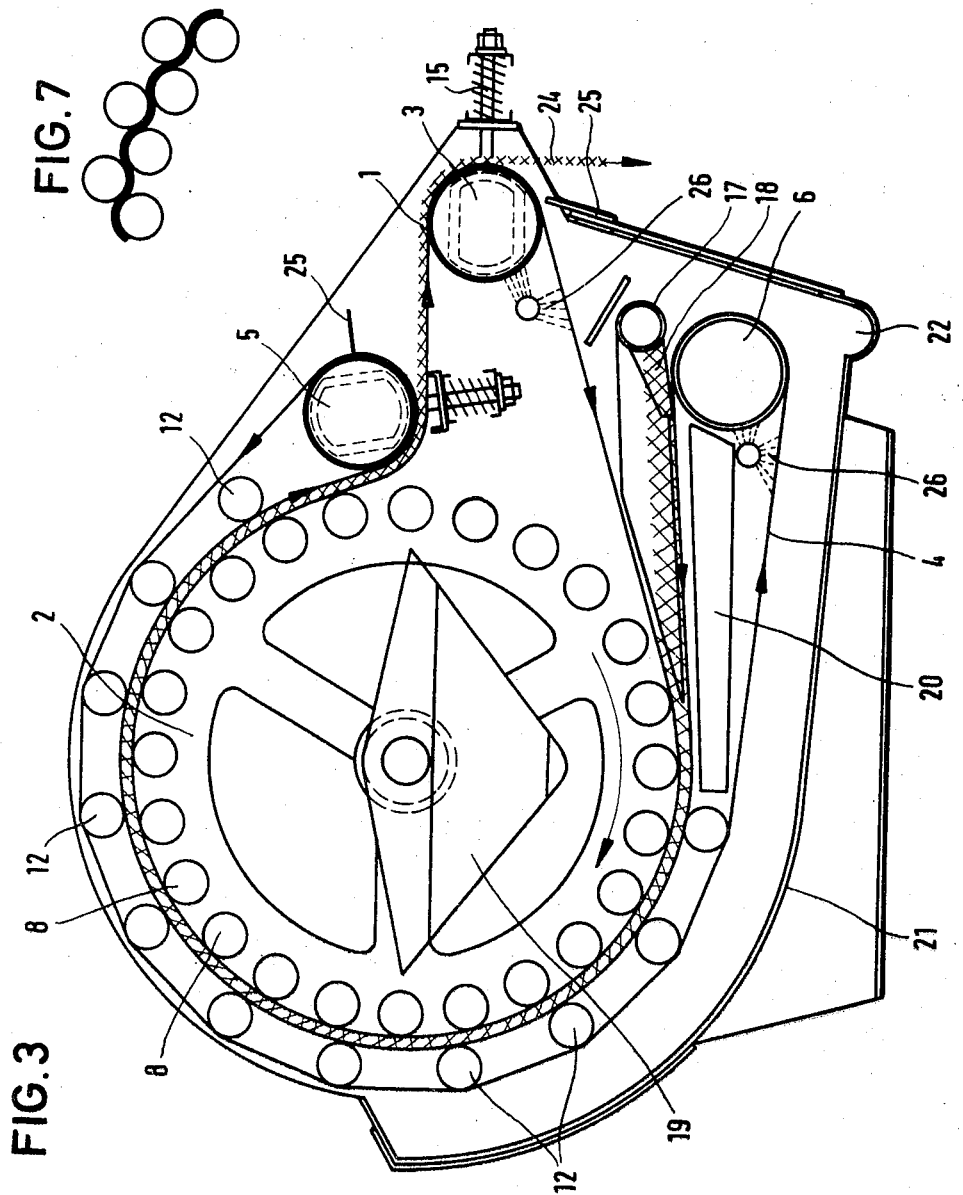

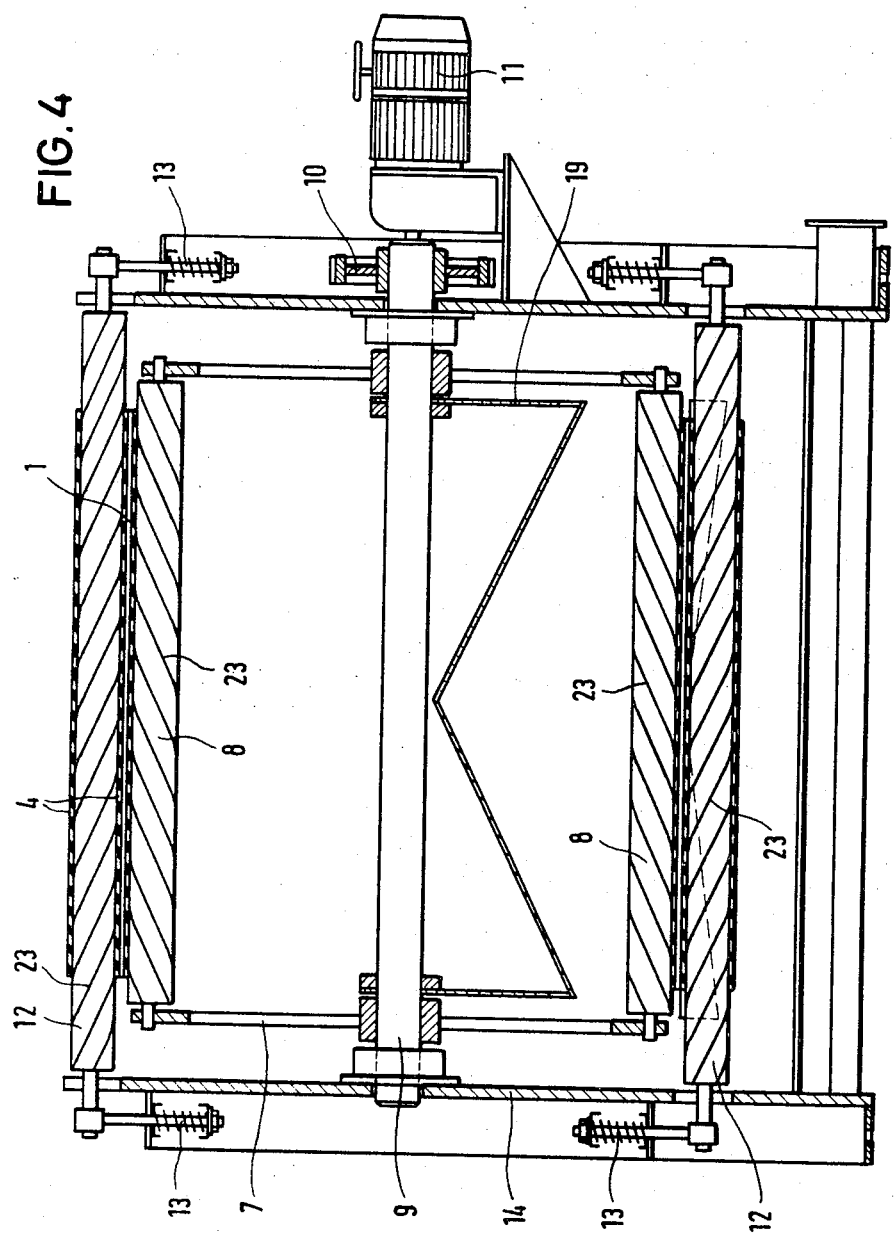

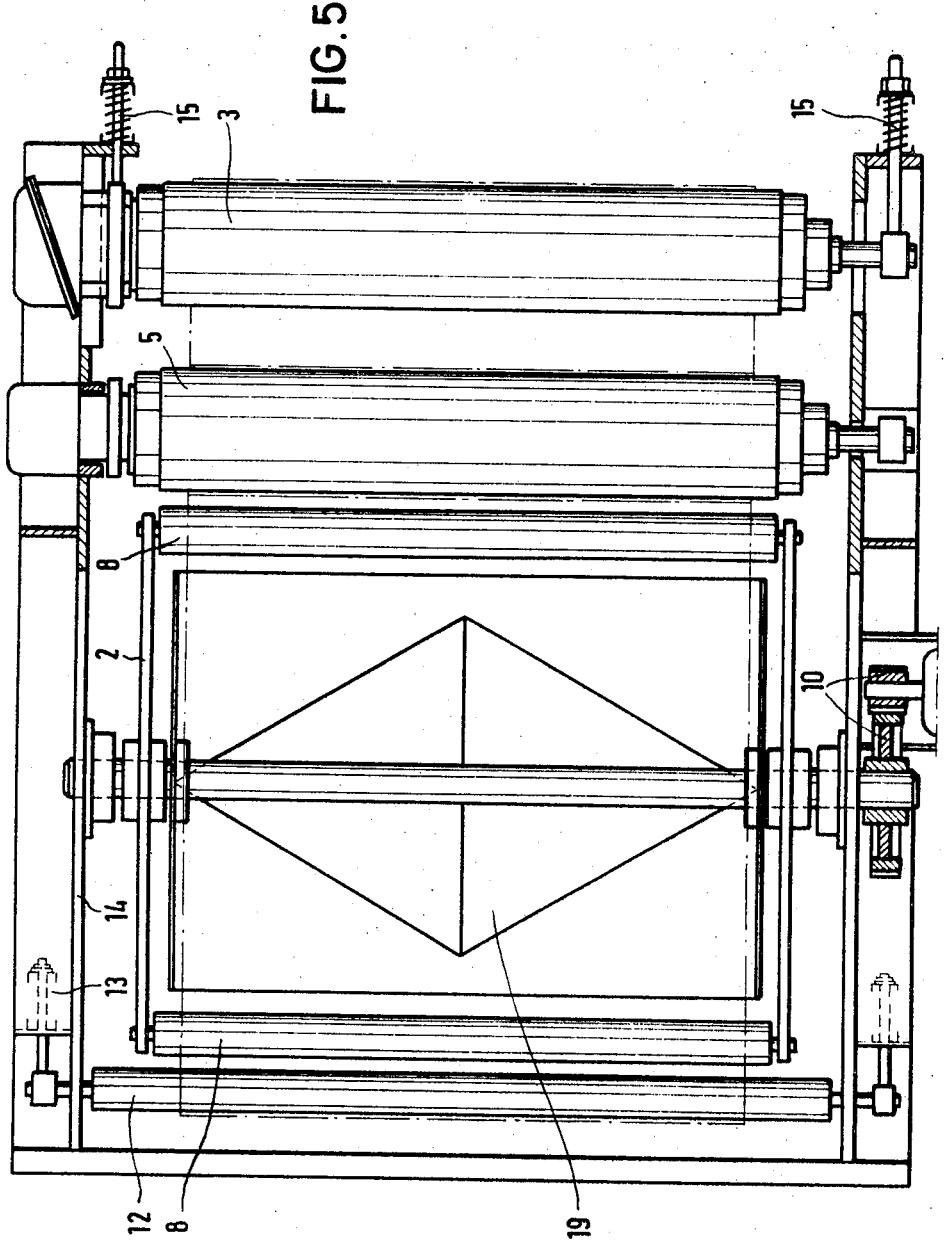

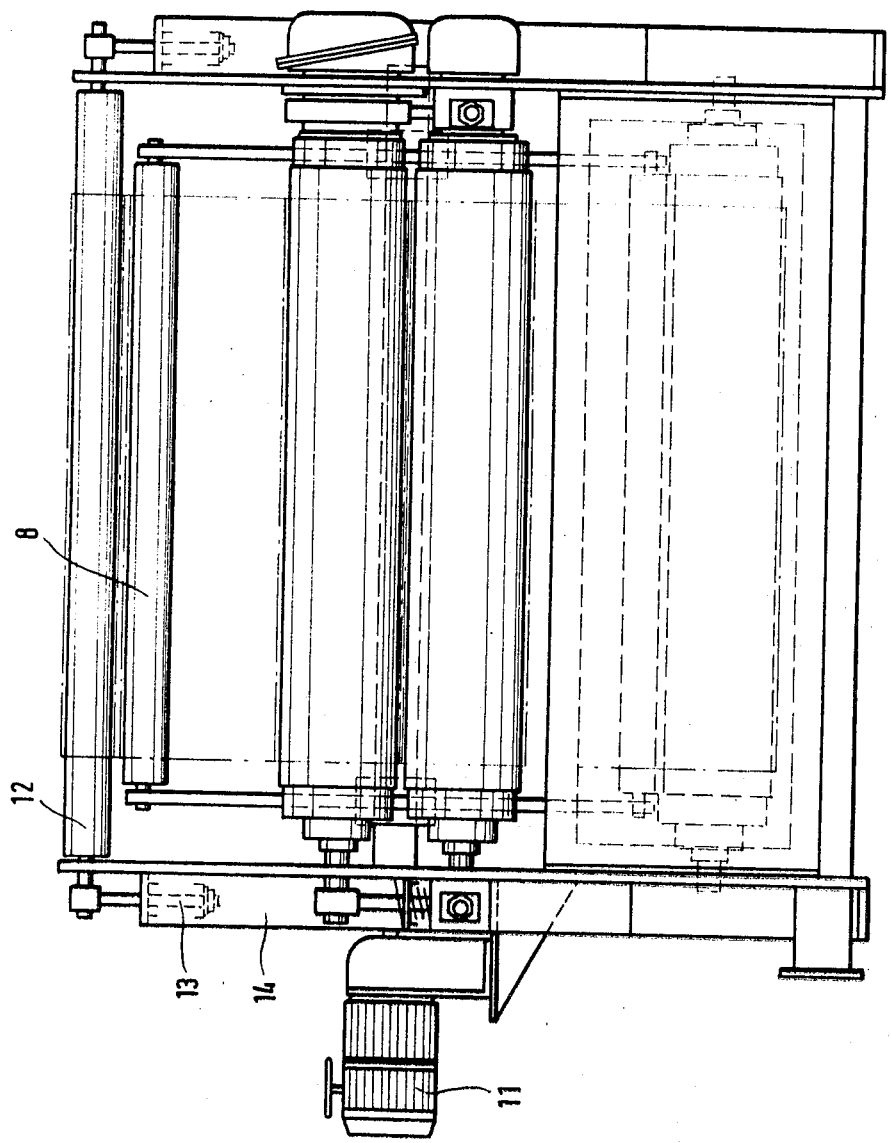

INVENTOR
ALBERT BAHR

FILTER PRESS, MORE PARTICULARLY FOR DEWATERING SLUDGE IN SEWAGE TREATMENT PLANTS

The present invention relates to a filter press, for use for example for dewatering sludge in sewage treatment plants.

It is known for the sludge which accumulates in sewage treatment plants to be dewatered, after an addition of organic or inorganic filter adjuvants, in a filter-belt press comprising a horizontal filter belt and a pressure belt thereabove. Not only is the construction of such presses relatively difficult and complex but they have more particularly the disadvantage of requiring special precautions to prevent the belts from wandering. Also, filtration performance is often unsatisfactory.

Also known are tower presses wherein two filter belts move at right-angles to one another under pressure; in contrast to filter-belt presses, both the belts of tower presses are used for filtering, but construction is very costly and the system has the disadvantage of the filtrate being continuously removed through the whole construction; also, not only is filtration sometimes unsatisfactory but there are particular difficulties in lateral sealing of the two filter belts.

It is an object of the invention to obviate these disadvantages and to provide a filter press, more particularly for dewatering sludge in sewage tratment plant, the press providing satisfactory filtration while being of fairly simple construction and taking up little space and ensuring a low residual water content.

Accordingly, the invention comprises a filter press having belts one at least of which is a filter belt extending around a drum and the sludge for dewatering is introducible between such belts. The press can comprise two belts both of which are filter belts. According to a feature of the invention, an inner filter belt extends in a closed loop around the drum and a second belt extends around the drum in a double loop the opposite closed ends of which are spaced apart.

It is known for two filter belts to extend around a drum in vacuum drum filters. However, in the known filters both the filter belts extend around the drum in a concentrically closed path and the filter cake is fed on the outside of the outer belt. A feature of the invention, however, is that dewatering is performed between two filter belts which extend around a drum.

Advantageously, the outer belt engages around the inner belt with pressure, so that the filter cake can be subjected to the necessary pressure. The pressure can be produced either just by the tension of the outer belt or by special load applying means e.g. pressure rollers.

According to a feature of the invention, the drum is of open construction. For example the same can incorporate rollers, in which case over at least some of their path around the drum the two belts are guided between radially inner rollers and radially outer rollers, if as above mentioned, the load applying means are pressure rollers. Preferably, the roller pressure is adjustable so that it can increase along the pressing path according to the nature of the sludge and to the required residual water content. Advantageously in this case, the inner rollers and the outer rollers are in staggered relationship to one another, to achieve squeezing of the filter cake between the two rings of rollers, the filter cake being alternately compressed and released.

The invention also relates to a process for dewatering sludge, more particularly clarifying sludge of sewage treatment plants; according to a main feature of the process, the sludge is dewatered between two belts which extend around a drum, with pressure. Preferably, the sludge is squeezed between the belts. Very advantageously in this case, drum speed leads or lags on the speed of the belts, so that the different speeds help to break up the cohesion of the filter cake between the various inner rollers and outer rollers, thus greatly improving dewatering.

An embodiment of the invention will now be described by way of example with reference to the accompanying drawings in which:

FIG. 2 is a side view of a drum filter press according to the invention;

FIG. 3 is a view of the drum filter press in cross-section;

FIG. 4 is a view of the drum filter press in longitudinal section;

FIG. 5 is a plan view of the drum filter press;

FIG. 6 is an end view of the feed side and ejection side, and

FIGS. 7-9 are fragmentary views showing details of the construction.

Figure 1:
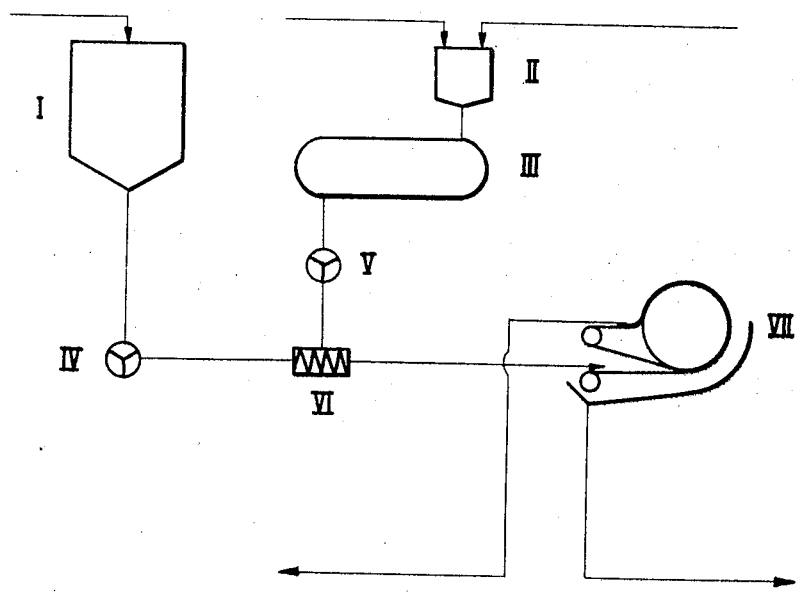
FIG. 1 is a flow diagram for sludge dewatering according to the invention.

Referring to FIG. 1 of the drawings, the installation shown has a sludge tank I, and an additives tank II for water and coagulant; water mixed with coagulant or some other filter adjuvant is supplied to coagulant tank III. There is a sludge dispenser IV and a coagulant dispenser V; coagulant is added to the sludge in a mixing tank VI and the resulting mixture is supplied to a drum filter press VII constructed in accordance with the invention.

Referring to FIGS. 2 to 6 of the drawings, an endless filter belt 1 extends around a cage structure or drum 2 and is driven by a driving drum 3, the belt 1 extending around the cage structure or drum 2 in a closed loop. A second endless filter belt 4 extends around drum 2 radially outwards of belt 1. The filter belt 4 is a double loop the ends of which are spaced apart from one another at one side of the drum, one end passing around a driving drum driven by a driving motor 5, the other end passing around a reversing drum 6.

In the embodiment shown, the filter press comprises a machine frame 14 supporting the drum 2 which is of open construction and comprises two circular end frames 7 on a shaft 9 supported at its opposite ends in the machine frame 14. The end frames 7 are spaced apart lengthwise of the shaft 9 and support between them a plurality of rollers 8 spaced circumferentially from one another around the end frames the rollers extending parallel to the shaft 9 the endless belt 1 bearing on the rollers 8. The drum 2 is positively driven by a variable speed driving motor 11 mounted on the machine frame 14 through gears 10. Alternative to the positive drive, the drum can be capable of free rotation so as to be rotatable by the endless belts.

Disposed radially outwards of the rollers 8 of drum 2, are a plurality of counter rollers 12, referred to as pressing rollers. The rollers 12 are supported by the machine frame 14 and only partially around the drum 2, the rollers 12 being circumferentially spaced from one another. The rollers 12 are disposed radially outwards of the endless filter belt 4. The rollers 12 are mounted so as to be capable of radial movement and are spring loaded by springs 13 the spring action urging the rollers radially inwards to apply pressure to the filter belts. Means are provided to permit variation of the spring loading so that the pressure applied by the rollers 12 can be varied. Further the pressure can be adjusted so that the same is different at predetermined circumferential portions. For example it may be convenient for the compression springs 13 to be so adjusted that the spring pressure increases along the pressing path, to give a setting at which the rollers 12, which are all staggered in relation to the inner rollers 8, are pressed between the rollers 8 by spring pressure at the end of the pressing path so that the two filter belts follow a sinuous path between the various rollers as shown in FIG. 7.

The driving motor 3 for filter belt 1 is bodily movable against spring loading provided by compression spring 15 the loading of which is adjustable. Similarly, the driving motor 5 for the filter belt 4 is bodily movable against spring loading provided by compression spring 16 the loading of which is adjustable. Such arrangements maintain the tension of the filter belts during operation of the press and also permit the tension to be adjusted.

Sludge is supplied to the filter belt 4 through feed pipe 17 and nozzle 18 the sludge being delivered onto a central portion of the filter belt and in a quantity such as exactly to fill up the space between the two filter belts over the pressing path, thus obviating the necessity for special lateral sealing means to prevent overflow at the edges of the filter belts. It may however be desirable for one or both of the filter belts to have thickened side edges to provide lateral sealing as hereinafter described. The sludge supplied through the pipe 17 and nozzle 18 is squeezed and conveyed between the two belts 1 and 4 as if in a chamber, the two filter belts running at the same speed, which may be varied. The expressed water issues inwardly and outwardly through the belts 1, 4, is collected in receptacles 19, 20 and supplied via sump 21 to collecting pipe 22. For improved dewatering, the rollers 8, 12, are, conveniently, formed with grooves 23.

The expressed filter cake is ejected near the driving roller 3 at a place 24; if required, scrapers 25 or appropriately disposed blowing nozzles can be provided to detach the filter cake. The filter belts are cleaned by sprinklers 26.

Figure 8:
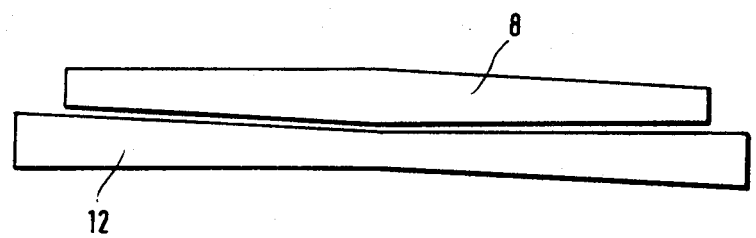

As shown diagrammatically in FIG. 7, the pressing rollers 12 can, more particularly over about the last third of the pressing path around the drum, be pressed so tightly into the gaps between the rollers 8 by increasing the stressing of the springs 13 that the belts 1, 4 and the filter cake move sinuously and the cake is given alternate squeezing and release. To increase this effect the drum 2 can be driven faster or slower than the filter belts. As FIG. 8 shows, the rollers 8, 12 can be taper rollers.

Figure 9:
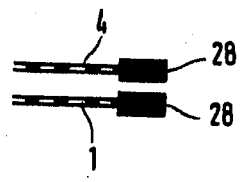

As already mentioned, the quantity of filter cake supplied can be such that no lateral sealing is necessary between the filter belts 1 and 4. However, and as shown in FIG. 9, the filter belts 1, 4 can have lateral edge thickenings 28 to act as a lateral seal.

The invention therefore provides a filter press which is of simple and robust construction, takes up little space and provides a high and adjustable filtering capacity. There is no risk of the two filter belts of the press according to the invention wandering. A particular advantage provided by the invention is *inter alia* adjustability of pressing capacity, a low residual water content being achieved for a reduced power consumption. The filter press according to the invention is intended more particularly for the dewatering of communal sludge, but it can be used for any other sludges such as e.g. industrial effluent, hydroxide sludge, preparation sludge, wet dust removal sludge or the like.

I claim:

1. A filter press comprising a machine frame, a cylindrical cage structure mounted on said frame for rotation about an axis and having a circular series of relatively rotatable belt supporting rollers on a pitch circle concentric with the axis of said cage structure; a circular series of counter rollers concentric with the axis of said cage structure; bearing means on said machine frame mounting said counter rollers on a pitch circle of larger diameter than said pitch circle of said belt supporting rollers and supporting said counter rollers on parallel axes extending axially of said cage sturcture; first and second endless belts extending partially around said cage structure between said belt supporting rollers and said counter rollers, at least one of said belts being a filter belt, and the belt supported by said cage structure presenting its radially outer side to the radially inner side of the other belt; roller means cooperable with said other belt for placing the latter in double loop formation and presenting the closed ends of the double loop in relatively spaced relation at one side of said cage structure; and sludge feeding means operable to deliver sludge between the belts at said one side of said cage structure.

2. A filter press as set forth in claim 1 wherein said bearing means for said counter rollers support the latter for radial movement relative to said cage structure, and wherein resilient means are operatively interposed between said machine frame and said bearing means so as to yieldingly urge said counter rollers toward said cage structure.

3. A filter press as set forth in claim 1 wherein the number of belt supporting rollers on said cage structure is larger than the number of counter rollers on said machine frame.

4. A filter press as set forth in claim 1 and further comprising variable speed power transmitting means for driving said cage structure.

5. A filter press as set forth in claim 1 wherein both of said belts are filter belts and wherein fluid intercepting means are mounted within said cage structure.

6. A filter press as set forth in claim 1, where said axis is disposed horizontally.

* * * * *